United States Patent
Matsubara et al.

(10) Patent No.: US 8,670,201 B2
(45) Date of Patent: Mar. 11, 2014

(54) MAGNETIC RECORDING DEVICE

(75) Inventors: Masato Matsubara, Yokohama (JP); Masato Shiimoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 65 days.

(21) Appl. No.: 13/402,972

(22) Filed: Feb. 23, 2012

(65) Prior Publication Data

US 2013/0050866 A1    Feb. 28, 2013

(30) Foreign Application Priority Data

Aug. 29, 2011  (JP) .................................. 2011-186418

(51) Int. Cl.
*G11B 5/596*    (2006.01)

(52) U.S. Cl.
USPC .......................................................... 360/51

(58) Field of Classification Search
USPC ........... 360/48, 51, 75, 68, 46, 44, 45, 59, 43, 360/88
See application file for complete search history.

(56) References Cited

U.S. PATENT DOCUMENTS

| | | | |
|---|---|---|---|
| 6,493,161 B1* | 12/2002 | Elliott et al. | 360/46 |
| 6,650,493 B2* | 11/2003 | Dakroub | 360/46 |
| 7,522,369 B1* | 4/2009 | Rahgozar et al. | 360/75 |
| 7,796,355 B2* | 9/2010 | Benakli et al. | 360/68 |
| 2013/0128375 A1* | 5/2013 | Livshitz et al. | 360/48 |

FOREIGN PATENT DOCUMENTS

JP    6-243527    9/1994

OTHER PUBLICATIONS

Xiaochun Zhu et al., Bias-Field-Free Microwave Oscillator Driven by Perpendicularly Polarized Spin Current, IEEE Transactions on Magnetics, Oct. 2006, pp. 2670-2672, vol. 42, No. 10.

Jian-Gang Zhu et al., Microwave Assisted Magnetic Recording, IEEE Transactions on Magnetics, Jan. 2008, pp. 125-131, vol. 44, No. 1.

Yiming Wang et al., Media damping constant and performance characteristics in microwave assisted magnetic recording with circular ac field, Journal of Applied Physics, 105, 07B902, 2009.

* cited by examiner

*Primary Examiner* — Nabil Hindi
(74) *Attorney, Agent, or Firm* — Antonelli, Terry, Stout & Kraus, LLP.

(57) ABSTRACT

In a magnetic recording device adopting a microwave assisted recording method, a microwave frequency on a positive polarity side and a microwave frequency on a negative polarity side are adjusted to be optimal.

The magnetic recording device of the invention supplies to a magnetic head a write current of which a current waveform on the positive polarity side and a current waveform on the negative polarity side are asymmetric.

7 Claims, 7 Drawing Sheets

FIG. 4
(a) Related art
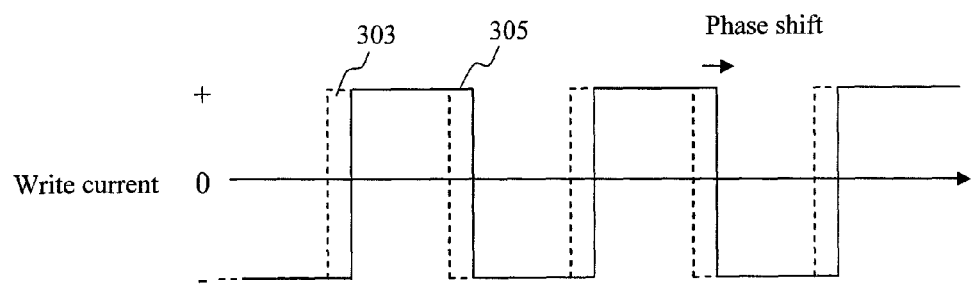
(b) Present invention
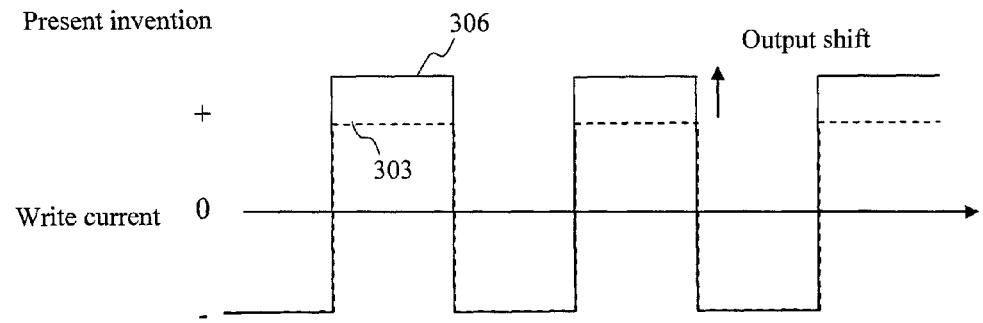

FIG. 8
(a) Related art
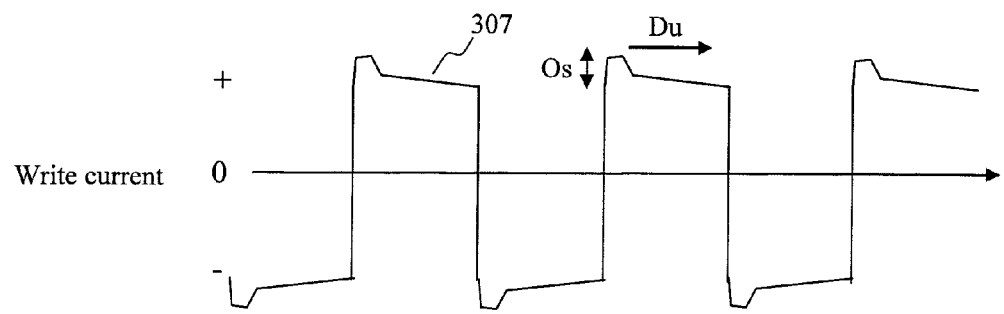
(b) Present invention
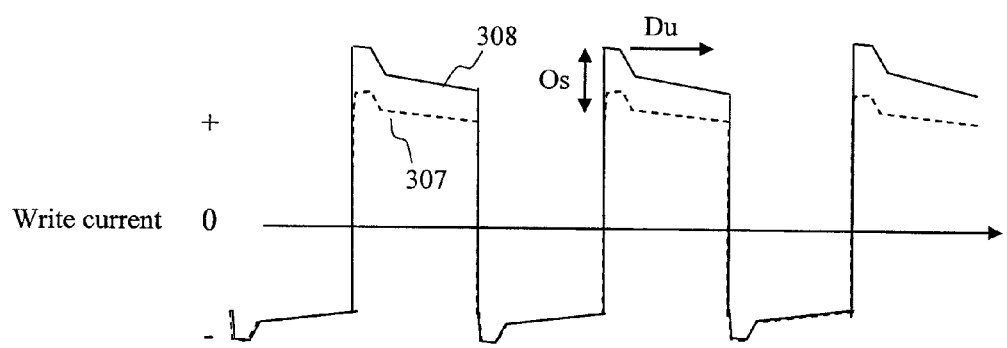

MAGNETIC RECORDING DEVICE

CLAIM OF PRIORITY

The present application claims priority from Japanese patent application JP 2011-186418 filed on Aug. 29, 2011, the content of which is hereby incorporated by reference into this application.

BACKGROUND OF THE INVENTION

1. Field of the Invention

The present invention relates to a magnetic recording device.

2. Background Art

A bit size on a recording medium has become minute along with an increased recording capacity of a hard disk drive (HDD). However, when the bit size becomes minute, there arises a problem of loss of magnetization information due to thermal fluctuation. To solve such a problem and stably maintain a recording bit with an increased recording capacity, it is required to use a recording medium having a large coercive force (i.e., a large magnetic anisotropy).

An intensive recording magnetic field is required to record information on a recording medium having a large coercive force. In practice, however, the intensity of the recording magnetic field is limited because of narrowing of a recording head and limitation of utilizable magnetic materials. Accordingly, the coercive force of the recording medium is restricted by the intensity of the recording magnetic field generated by the recording head.

To achieve two conflicting aims of providing the thermal stability of the medium and the coercive force for easily recording information, methods for effectively lowering the coercive force of the recording medium using various auxiliary means only during recording have been suggested. Thermally assisted recording for recording information with use of heating means such as a magnetic head and laser is a typical example of such methods.

There is also a method for recording information while locally reducing the coercive force of the recording medium with use of a high frequency magnetic field as a recording magnetic field from a recording head. For example, JP Patent Publication (Kokai) No. 6-243527 discloses a technique of recording information while locally reducing a coercive force of a recording medium by subjecting the magnetic recording medium to joule heating or magnetic resonance heating by means of a high frequency magnetic field. In such a method for recording information by means of magnetic resonance between the high frequency magnetic field and a magnetic head magnetic field (hereinafter referred to as microwave assisted recording), a strong high frequency magnetic field, which is proportional to an anisotropy field of the recording medium, needs to be applied so as to reduce intensity of a magnetic reversal field.

X. Zhu and J. G. Zhu, "Bias-Field-Free Microwave Oscillator Driven by Perpendicularly Polarized Spin Current", IEEE TRANSACTIONS ON MAGNETICS, P2670 VOL. 42, No. 10 (2006) discloses calculation results relating to a spin-torque oscillator that is free of a bias magnetic field from the outside.

J. G. Zhu, X. Zhu and Y. Tang, "Microwave Assisted Magnetic Recording", IEEE TRANSACTIONS ON MAGNETICS, VOL. 44, NO. 1, pp. 125-131, JANUARY 2008 discloses a technique of recording information on a magnetic recording medium having a large magnetic anisotropy by disposing a field generation layer (FGL) that rapidly rotates based on spin torque near a magnetic recording medium adjacent to a main magnetic pole of a vertical magnetic head and generating a microwave (high frequency magnetic field).

Y. Wang, Y. Tang and J. G. Zhu, "Media damping constant and performance characteristics in microwave assisted magnetic recording with circular ac field", JOURNAL OF APPLIED PHYSICS 105, 07B902 (2009) discloses a spin-torque oscillator that controls a rotational direction of an FGL with use of a magnetic field of a main magnetic pole adjacent to the FGL. Accordingly, microwave assisted magnetization reversal of a medium can be effectively achieved.

As a recording compensation method with use of a write current, write pre-compensation has been suggested. By such a method, a non-linear transition shift (NLTS), which is generated by interference of magnetization between bits due to an increased recording capacity, is compensated. By shifting a phase of a specified bit in recording information, a specified bit array of data, of which a peak shift has a problem, is adjusted.

SUMMARY OF THE INVENTION

To effectively exhibit assisting effects caused by a microwave magnetic field generated from a spin-torque oscillator in a microwave assisted recording method, it is important that a frequency of the microwave magnetic field corresponds to a magnetic resonance frequency of a recording medium. It is because, in the microwave assisted recording method, a coercive force of magnetization of a medium is considerably reduced by ferromagnetic resonance of the microwave magnetic field and the magnetization of the medium, and consequently, a magnetization inversion magnetic field of the recording medium is considerably reduced.

When the assisting effects are effectively exhibited with use of the magnetic field generated from a main magnetic pole as disclosed in Y. Wang, Y. Tang and J. G. Zhu, "Media damping constant and performance characteristics in microwave assisted magnetic recording with circular ac field", JOURNAL OF APPLIED PHYSICS 105, 07B902 (2009), a positive magnetic field (magnetic field applied downward on the medium) and a negative magnetic field (magnetic field applied upward on the medium) exist in a main magnetic pole magnetic field. The positive and negative magnetic fields are applied on the spin-torque oscillator.

A microwave magnetic field frequency is known to correlate with intensity of a magnetic field applied on the spin-torque oscillator. As the intensity of the magnetic field is increased, the microwave magnetic field frequency is increased. Spin-torque oscillation is generated by counterbalance of spin-torque received by an FGL due to the spin of the spin-torque oscillator and an external magnetic field. When the spin-torque oscillator receives a strong magnetic field from the outside, the relaxation time of magnetization of the FGL is shortened and the magnetization rotation speed is increased. At the same time, the oscillation frequency of FGL magnetization is increased, i.e., the frequency of the microwave magnetic field is increased.

A microwave frequency generated from the spin-torque oscillator may be asymmetric about its positive and negative polarities depending on the shape or film characteristics of the spin-torque oscillator even when the magnetic field applied on the spin-torque oscillator from the main magnetic pole has the same absolute value at the positive and negative polarities. At this time, the microwave frequency in the negative magnetic field is deviated from the optimal frequency for the recording medium even when the microwave frequency in the positive magnetic field is optimal for the recording medium.

Accordingly, the assisting effects of the microwave cannot be used to the greatest extent possible. A signal-to-noise ratio (SNR), which indicates the signal quality, may be reduced.

An object of the present invention, which is contemplated in view of the problems as stated above, is to adjust a microwave frequency on a positive polarity side and a microwave frequency on a negative polarity side to be optimal in a magnetic recording device adopting a microwave assisted recording method.

The magnetic recording device according to the present invention supplies to a magnetic head a write current of which a current waveform on the positive polarity side and a current waveform on the negative polarity side are asymmetric.

The magnetic recording device according to the present invention adjusts the write current for each polarity so that the microwave frequencies in positive and negative magnetic fields are identical. Accordingly, information can be recorded with use of the optimal microwave frequency for a recording medium. Thus, the magnetic recording device which uses a microwave assisted effect to the maximum can be provided.

BRIEF DESCRIPTION OF THE DRAWINGS

FIG. 4 is a time chart of a write current 303.

FIG. 8 is a time chart of a write current 307 according to a second embodiment.

DETAILED DESCRIPTION OF THE PREFERRED EMBODIMENTS

Figure 1:
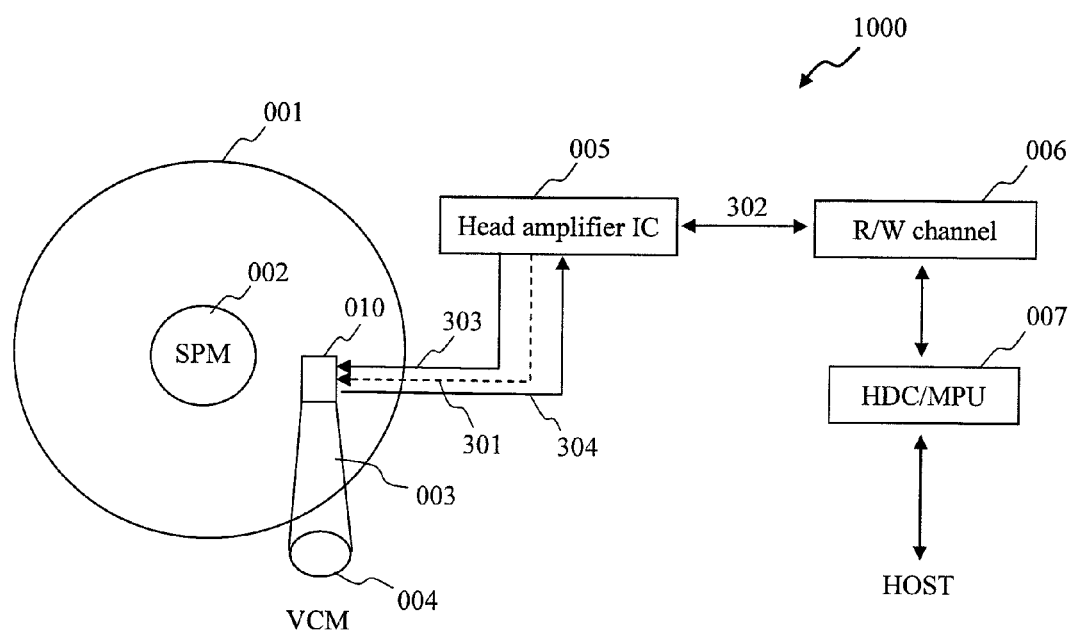
FIG. 1 is a diagram showing a magnetic recording device 1000 according to a first embodiment.

Embodiments of the present invention will be explained below with reference to the accompanying drawings. The same parts or components are denoted by the same reference numerals for facilitating understanding.

[First Embodiment]

FIG. 1 is a diagram showing a magnetic recording device 1000 according to a first embodiment. The magnetic recording device 1000 is a magnetic disk device including a magnetic disk 001 and a magnetic head 010. The magnetic head 010 includes a later-described spin-torque oscillator 110.

The center of the magnetic disk 001 is fixed. A spindle motor (SPM) 002 rotates the magnetic disk 001. An actuator 003 fixes the position of the magnetic head 010. A voice coil motor 004 drives the actuator 003 to move the magnetic head 010 on the magnetic disk 001 in the radial direction.

The magnetic recording device 1000 further includes a head amplifier IC 005, a read-write channel (R/W channel) 006, a hard disk controller (HDC)/microprocessor (MPU) integrated circuit 007 (hereinafter referred to as HDC/MPU 007).

The HDC/MPU 007 receives write data from an external host and transmits the write data to the head amplifier IC 005 via the R/W channel 006. The head amplifier IC 005 supplies a write current 303, which corresponds to a write signal 302 supplied from the R/W channel 006, to the magnetic head 010. The magnetic head 010 writes a signal corresponding to the write current 303 on the magnetic disk 001.

The magnetic head 010 reads the data stored in the magnetic disk 001 as a read signal 304. The head amplifier IC 005 amplifies the read signal 304 and outputs the read signal 304 from the HDC/MPU 007 to the external host via the R/W channel 006.

The head amplifier IC 005 includes an STO current applying device that generates a drive signal (current or voltage) 301 for supplying spin to the spin-torque oscillator 110.

A "current supply circuit" and an "error rate measurement unit" according to the present invention correspond to the head amplifier IC 005.

Figure 2:
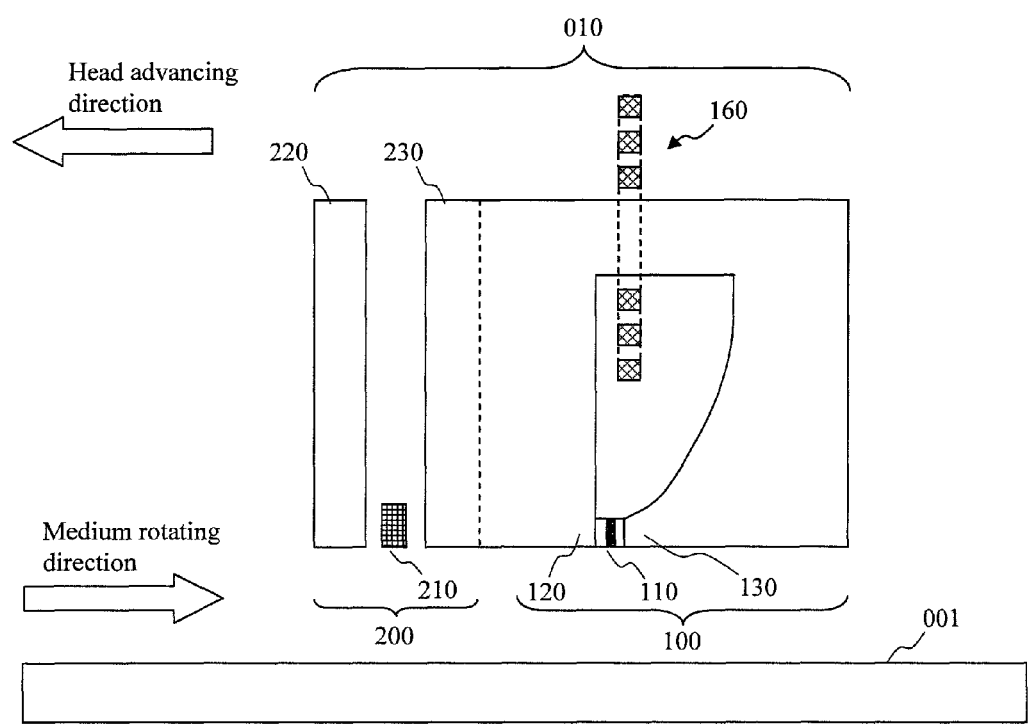
FIG. 2 is a schematic view showing a magnetic head 010.

FIG. 2 is a schematic view showing the magnetic head 010. The magnetic head 010 is a recording reproduction separation head including a recording head section 100 and a reproducing head section 200.

The recording head section 100 includes a spin-torque oscillator 110, a main magnetic pole 120, and a coil 160. The spin-torque oscillator 110 generates a high frequency magnetic field. The main magnetic pole 120 generates a recording head magnetic field. The coil 160 magnetizes a magnetic field to the main magnetic pole 120. A trailing shield 130 can be further provided in a trailing direction of the main magnetic pole 120.

The trailing direction is opposite to the advancing direction toward a recording medium of the magnetic head 010. A reading direction is the advancing direction toward a pair of medium of the magnetic head 010. Although not shown in FIG. 2, a side shield may be provided on the outer side of the main magnetic pole 120 in the track width direction.

In the structure as shown in FIG. 2, the reproducing head section 200 is disposed on the front side and the recording head section 100 is disposed on the rear side as viewed in the advancing direction of the magnetic head 010 relative to the magnetic disk 001. However, the recording head section 100 may be disposed on the front side and the reproducing head section 200 may be disposed on the rear side as viewed in the advancing direction of the magnetic head 010.

The reproducing head section 200 includes a reproducing sensor 210, a lower magnetic shield 220, and an upper magnetic shield 230. The reproducing sensor 210 may have any structure as long as it can reproduce a recording signal. The reproducing sensor 210 may be configured to provide the giant magneto-resistive (GMR) effect, the tunneling magneto-resistive (TMR) effect, or the electro mechanical resonant (EMR) effect. The reproducing sensor 210 may be also configured as a differential reproducing sensor having two or more reproducing sensors to respond to an external magnetic field using the reverse polarity. The lower magnetic shield 220 and the upper magnetic shield 230 are important to improvement of the reproducing signal quality and are preferably provided.

Figure 3:
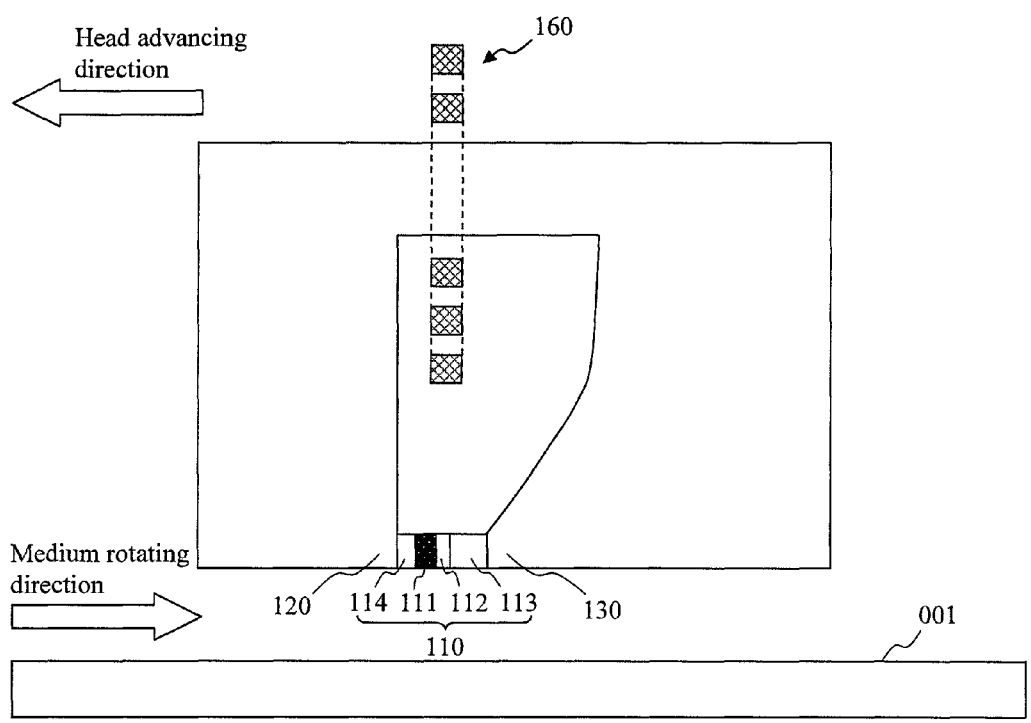
FIG. 3 shows a detailed arrangement of a recording head section 100 and a spin-torque oscillator 110 which is a part of the recording head section 100.

FIG. 3 shows a detailed arrangement of the recording head section 100 and the spin-torque oscillator 110 which is a part of the recording head section 100. A recording layer of a vertical recording medium 001 shown in FIG. 3 is magnetized in the direction magnetically vertical to an air bearing surface (ABS).

The magnetic disk 001 generally includes a protective film, a recording layer, a soft magnetic under-layer, and the like. The magnetic disk 001 may be a continuous medium containing continuous bits, or a discrete track medium provided with a nonmagnetic region, to which a recording head cannot write information, between a plurality of tracks. Further, the magnetic disk 001 may be a patterned medium containing a protruded magnetic pattern and a nonmagnetic material filling recessed portions between the magnetic patterns on a substrate.

The spin-torque oscillator 110 of the magnetic head section 100 includes an FGL 111, an intermediate layer 112, a spin injection fixing layer 113, and a rotation guide layer 114. The FGL 111 generates a high frequency magnetic field. The intermediate layer 112 is made of a material having high spin permeability. The spin injection fixing layer 113 gives spin torque to the FGL 111. The rotation guide layer 114 stabilizes magnetization rotation of the FGL 111.

The main magnetic pole 120 and the trailing shield 130 can be used as poles for the spin-torque oscillator 110. A current is delivered orthogonally to the film surface of the spin-torque oscillator 110. Due to the current, the spin can be injected to the spin-torque oscillator 110.

The spin-torque oscillator 110 may be provided by laminating the rotation guide layer 114, the FGL 111, the intermediate layer 112, and the spin injection fixing layer 113 in this order from the side close to the main magnetic pole 120 as shown in FIG. 3. Alternatively, the spin-torque oscillator 110 may be provided by laminating the spin injection fixing layer 113, the intermediate layer 112, the FGL 111, and the rotation guide layer 114 in this order from the side close to the main magnetic pole 120.

The maximum film thickness of the spin-torque oscillator 110 is approximately 200 nm, but the minimum film thickness thereof is not particularly decided. When the total film of the spin-torque oscillator 110 is too thick, the distance between the main magnetic pole 120 and the trailing shield 130 is excessively increased, and the magnetic field applied to the oscillator 110 from the main magnetic pole 120 is considerably attenuated. Consequently, the high frequency oscillation of the FGL 111 cannot be continued.

The intermediate layer 112 according to the first embodiment is made of Cu and has the film thickness of 2 nm. Preferable materials for the intermediate layer 112 are nonmagnetic and conductive, and may include Au, Ag, Pt, Ta, Ir, Al, Si, Ge, and Ti.

The spin injection fixing layer 113 according to the first embodiment is made of Co/Pt and has the film thickness of 10 nm. The vertically anisotropic magnetic field Hk of Co/Pt used in the first embodiment is 8 kOe. The use of a vertically anisotropic material for the spin injection fixing layer 113 stabilizes oscillation of the FGL 111. In addition to Co/Pt, it is preferable to use artificial magnetic materials such as Co/Ni, Co/Pd, and CoCrTa/Pd. The same materials as used for the FGL 111 may be used.

The rotation guide layer 114 according to the first embodiment is made of Co/Ni having vertical anisotropic energy and has the film thickness of 10 nm. The vertically anisotropic magnetic field Hk of Co/Ni used in the first embodiment is 5 kOe. The rotation guide layer 114 is preferably made of the same materials as used for the spin injection fixing layer 113.

Since the spin-torque oscillator 110 has the above-mentioned configuration, the high frequency magnetic field can be applied to the magnetic disk 001.

In the first embodiment, the main magnetic pole 120 and the trailing shield 130 are preferably made of a CoFe alloy that features large saturated magnetization and indicates little crystal magnetic anisotropy. In addition to FeCo alloys, materials for the FGL 111 may include NiFe alloys, Heusler alloys such as CoFeGe, CoMnGe, CoFeAl, CoFeSi, CoMnSi, and CoFeSi, Re-TM amorphous alloys such as TbFeCo, and CoCr alloys. Further, the materials may include CoIr that has negative vertical anisotropic energy.

The magnetic recording device 1000 according to the first embodiment is explained above. A write current for writing information on the magnetic disk 001 will be explained below.

A magnetic field is generated from the main magnetic pole 120 by supplying the write current to the coil 160 and exciting the main magnetic pole 120 by electromagnetic induction. A conventional write current supplied to the coil 160 has a symmetrical magnitude in positive and negative polarities. On the other hand, according to the present invention, the magnitude of the write current is adjusted for each polarity to improve the microwave assisted effect.

FIG. 4 is a time chart of the write current 303. For comparison, FIG. 4(a) shows a waveform of the write current 303 according to a related art and FIG. 4(b) shows a waveform of the write current 303 according to the present invention.

In the write current 303, the positive polarity and the negative polarity are alternatively switched to generate the positive and negative magnetic fields from the main magnetic pole 120. The phase of the write current 305 is shifted by write pre-compensation. Traditionally, the phase is shifted by identifying a phase shift generated by NLTS in advance based on a reproducing signal.

In the write current 306 according to the present invention, the output of the write current 303 is shifted at the positive or negative polarity. The head amplifier IC 005 adjusts the write current 306 for each polarity to sufficiently exhibit the microwave assisted effect.

For shifting the output of the write current 303, the head amplifier IC 005 may apply a positive or negative DC component to the write current 303, the R/W channel 006 may shift the write signal 302, or the head amplifier IC 005 may shift the write current 303.

The reason why the write current 303 is adjusted for each polarity and the improvement effect of recording characteristics caused by the adjustment will be explained in detail below.

Figure 5:
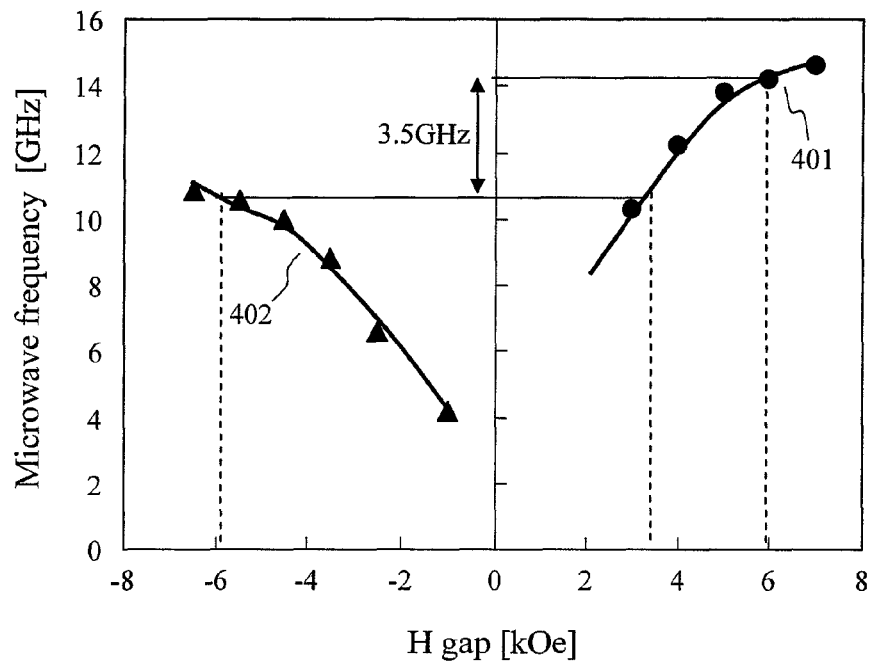
FIG. 5 shows an experimental example relating to a magnetic field applied on the spin-torque oscillator 110 between a main magnetic pole 120 and a shield 130 and a microwave frequency.

FIG. 5 shows an experimental example relating to a magnetic field (gap magnetic field: Hgap) applied on the spin-torque oscillator 110 between the main magnetic pole 120 and the shield 130 and the microwave frequency. The width Tw of the spin-torque oscillator 110 in the track width direction is 60 nm, its height SH in the element height direction is 90 nm, and the drive current is 6.5 mA.

The write current 303 is supplied to the coil 160 to excite the main magnetic pole 120, and consequently, the gap magnetic field Hgap is generated between the main magnetic pole 120 and the trailing shield 130. The gap magnetic field Hgap correlates with the magnitude of the write current 303. Thus, the horizontal axis of FIG. 5 can also indicate the write current 303. When the positive write current 303 is applied, the gap magnetic field Hgap in the positive direction is applied.

In conventional microwave magnetic recording, the magnetic head section 100 uses the write current 303 having the same magnitude at both positive and negative polarities and generates the positive magnetic field and negative magnetic field alternatively. At the same time, the magnetic field generated from the write current 303 having the same magnitude at both positive and negative polarities is applied to the spin-torque oscillator 110. At this time, a microwave frequency which is symmetric in the positive polarity side and negative polarity side relative to the magnetic field applied to the spin-torque oscillator 110 is generated. When the microwave corresponds to the magnetic resonance frequency of the recording medium, the high assisting effects can be obtained.

However, as obvious from the experimental example shown in FIG. 5, in the actual spin-torque oscillator 110, there is a large difference between frequency dependency 401 of a microwave generated by the positive magnetic field and frequency dependency 402 of a microwave generated by the negative magnetic field.

In FIG. 5, the microwave frequency is 14 GHz when the positive magnetic field is +6 kOe while the microwave frequency is 11.5 GHz when the negative magnetic field is −6 kOe, causing a difference of 3.5 GHz.

The magnetic recording device 1000 according to the present invention adjusts the write current 303 for each polarity. When the value of the write current 303 corresponding to the negative magnetic field of −6 kOe is set to a value corresponding to the positive magnetic field of +3.5 kOe, the microwave frequencies can be 11.5 GHz at the both polarities.

In actual microwave assisted magnetic recording, it is important that the magnetic resonance frequency of the recording medium corresponds to the microwave frequency. The microwave frequency on the positive polarity side and the microwave frequency on the negative polarity side become the same by adjusting the write current 303 for each polarity, so that the magnetic recording can be assisted at the optimal frequency.

Next, the amount of reduction of the recording characteristics when the microwave frequency is deviated from the optimal frequency for the recording medium will be explained below.

Figure 6:
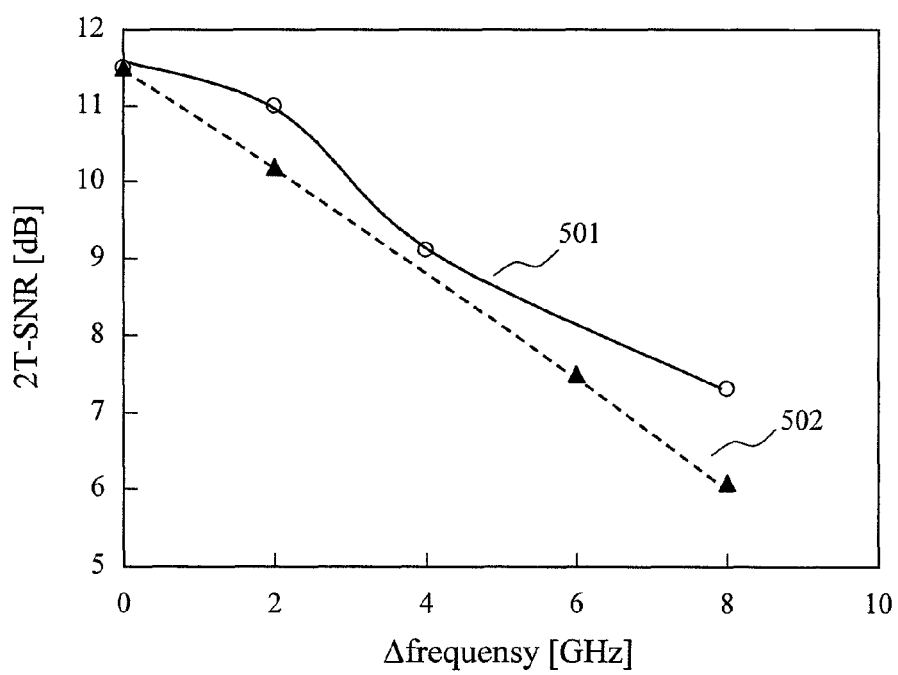
FIG. 6 shows a relationship between deviation of the microwave frequencies with positive and negative polarities and signal quality.

FIG. 6 shows a relationship between deviation of microwave frequencies at positive and negative polarities and signal quality. When the microwave frequency at the positive polarity is the optimal frequency for the recording medium, the relationship between the deviation of the microwave frequency at the negative polarity and the optimal frequency for the recording medium and the signal quality (SNR) during recording and reproducing in such a state is shown in FIG. 6. The relationship is calculated on the assumption that the magnetic disk 001 is a vertical recording medium, the width Tw in the track width direction of the spin-torque oscillator 110 is 40 nm, and the height SH in the element height direction is 40 nm.

The horizontal axis of FIG. 6 indicates the difference between the microwave frequency when the negative write current 303 is applied and the microwave frequency when the positive write current 303 is applied. The positive microwave frequency is constant. The vertical axis of FIG. 6 indicates SNR (2T-SNR) when the frequency of the write current 303 is one-half of the maximum operation frequency (twice as the cycle T).

A curved line 501 indicates the negative frequency shifted closer to the high frequency than the positive frequency. A curved line 502 indicates the negative frequency shifted closer to the low frequency than the positive frequency.

As obvious from FIG. 6, the negative microwave frequency becomes the maximum SNR simultaneously with the positive microwave frequency (Δfrequency=0 GHz), and the signal quality is decreased as being separated from the positive frequency at both the high frequency side and the low frequency side. For example, when the negative microwave frequency is shifted by 4 GHz, SNR is reduced by 2 dB compared to the optimal frequency.

The magnetic recording device 1000 according to the present invention adjusts the magnitude of the write current 306 for each polarity and adjusts the microwave frequency generated by the spin-torque oscillator 110 for each polarity so as to prevent deterioration of assisted effects caused by mismatch of the microwave frequency and the resonance frequency of the recording medium and maximize the effect of the microwave assisted recording.

Figure 7:
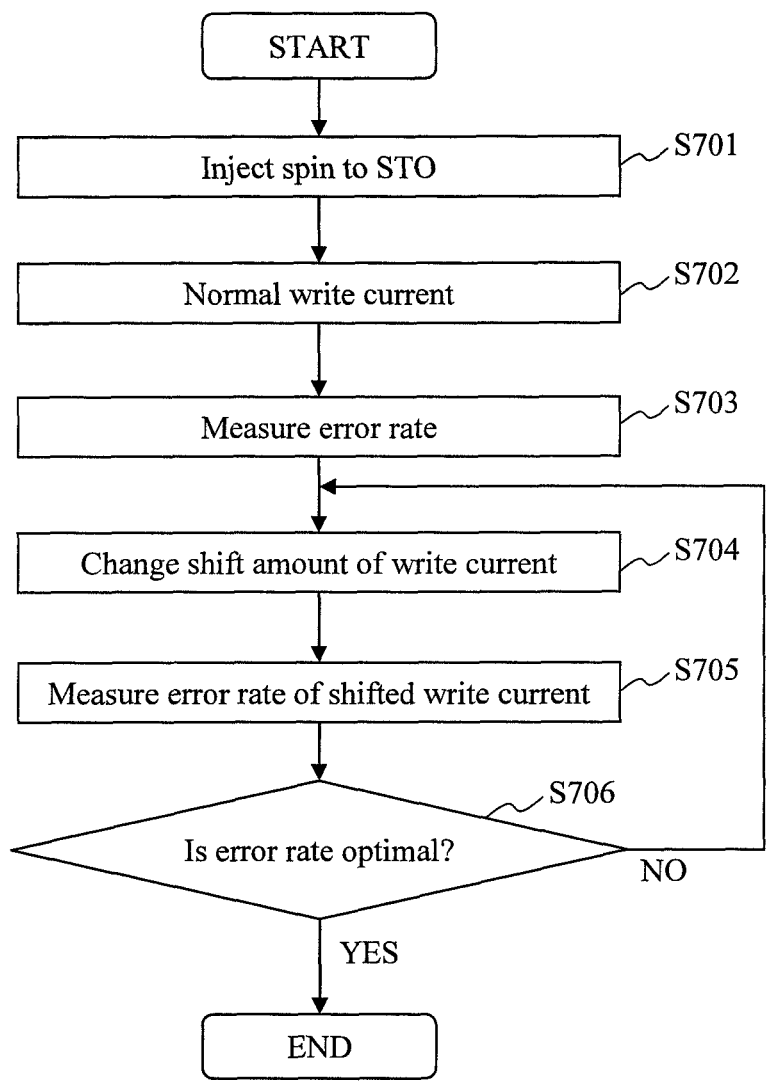
FIG. 7 is a flow chart showing a processing conducted by the magnetic recording device 1000 for optimizing the write current 303.

FIG. 7 is a flow chart showing a processing conducted by the magnetic recording device 1000 for optimizing the write current 303. Each step shown in FIG. 7 will be explained below.

(FIG. 7: Step S701)

The head amplifier IC 005 applies the drive current to the spin-torque oscillator 110 from the main magnetic pole 120 and the pole of the trailing shield 130 to inject the spin. For example, the head amplifier IC 005 applies the current with the current density of $1\times10^8$ A/cm$^2$ as the drive current. Accordingly, the spin can be injected from the spin injection layer 113 making up the spin-torque oscillator 110 to the FGL 111. At this time, the magnetic field is not applied to the spin-torque oscillator 110, so that the FGL 111 does not oscillate.

(FIG. 7: Step S702)

The head amplifier IC 005 supplies the write current 303 to the coil 160 to excite the main magnetic pole 120. Here, a conventional write current symmetric at positive and negative polarities is applied for test writing. For example, the write current 303 of 32 mA is applied.

(FIG. 7: Step S703)

The head amplifier IC 005 measures an error rate under the write current 303 applied at the step S702, and determines the optimal write current 303 symmetric at the positive and negative polarities. The magnetic field corresponding to the write current 303 at the both positive and negative polarities is generated from the main magnetic pole 120 and is applied to the spin-torque oscillator 110. The FGL 111 spin-torque oscillates by counterbalance of the torque caused by the magnetic field and the torque caused by the drive current.

(FIG. 7: Step S704)

The head amplifier IC 005 applies the write current 306 of which a current value at one polarity is shifted. For example, the amplitude of the write current 303 only at the positive polarity is amplified by 10%. On the positive polarity side where the amplitude is amplified, the magnetic field corresponding to the current amount is generated from the main magnetic pole 120. The magnetic field generated on the positive polarity side of the write current 306 is larger than the magnetic field on the negative polarity side. Accordingly, the microwave frequency on the amplified positive magnetic field side is shifted closer to the high frequency side than the negative polarity side.

(FIG. 7: Step S705)

The head amplifier IC 005 measures an error rate while supplying the write current 306 to the coil 160.

(FIG. 7: Step S706)

The head amplifier IC 005 terminates the processing shown in the flow chart when the error rate measured at the step S705 is the optimal value, and returns to the step S704 to repeat the same processing when the error rate is not the optimal value. When the steps S704 and S705 are conducted twice or more, the write current 306 having a waveform (amplitude) different from that used before is used. By repeating the steps S704 to S706, the write current 306 providing the optimal microwave frequency at both positive and negative polarities can be detected.

[First Embodiment: Summary]

The magnetic recording device 1000 according to the first embodiment can generate a microwave frequency which is the same at both positive and negative polarities. Accordingly, the microwave magnetic field at both polarities can correspond to the magnetic resonance frequency optimal for the recording medium. Thus, the microwave assisted effect can be maximized.

[Second Embodiment]

In the first embodiment, an example was described in which the amplitude of the write current 303 at either one of positive and negative polarities is shifted so that the write current 303 has a waveform asymmetric between the positive and negative polarities, and the microwave frequencies for both polarities are optimally adjusted. In the second embodiment, a conventional overshoot current is used as means of adjusting the write current.

The overshoot current applies a current at higher level than the steady write current for a predetermined time when the polarity of the write current is reversed and reverses the polarity rapidly to improve writing speed.

As described in the first embodiment, it is required to apply a write current having a waveform different from a steady write current so as to allow the write current 303 to have a waveform asymmetric between the positive and negative polarities. Accordingly, a special circuit structure is required. However, when the magnetic recording device 1000 includes a function of applying the overshoot current, the write current can be deformed by using the overshoot current. Thus, in the second embodiment, the write current is adjusted using the overshoot current.

The function of applying the overshoot current may be provided with the function part such as the circuit for applying the write current, but it is not limited thereto. A special circuit may be separately provided.

FIG. 8 is a time chart of the write current 307 according to the second embodiment. In the second embodiment, the microwave frequency at the positive and negative polarities is adjusted by controlling the overshoot current for each polarity. Specifically, in the write current 307 using the overshoot current, (an absolute value of) a write current peak at either one of the positive and negative polarities and (an absolute value of) a write current peak at the opposite side can be increased by adjusting a peak value OS of the overshoot current (the write current 308).

In addition to the peak value of the overshoot current, by maintaining the peak value for a predetermined time (Du) from when the polarity of the write current is reversed, the write current 307 can be adjusted and the microwave frequency at both positive and negative polarities can be constantly maintained.

The present invention is not limited to the above-described embodiments, and various variations and modifications may be possible without departing from the scope of the present invention. The plurality of component elements in the above-described embodiments may be appropriately combined to reach various inventions. For example, some component elements may be deleted or appropriately combined to the different embodiment.

Description of Symbols
001: magnetic disk
002: spindle motor
003: actuator
004: voice coil motor
005: head amplifier IC
006: read write channel
007: hard disk controller
010: magnetic head
100: recording head section
110: spin-torque oscillator
111: FGL
112: intermediate layer
113: spin injection fixing layer
114: rotation guide layer
120: main magnetic pole
130: trailing shield
160: coil
200: reproducing head section
210: reproducing sensor
220: lower magnetic shield
230: upper magnetic shield
301: STO drive signal
302: write signal
303: write current
304: read signal

What is claimed is:

1. A magnetic recording device, comprising:
   a magnetic recording medium that records information;
   a magnetic head that applies a magnetic field to the magnetic recording medium;
   a spin-torque oscillator that generates a high frequency magnetic field; and
   a current supply circuit that supplies a write current for generating a magnetic field to the magnetic head to write information on the magnetic recording medium, wherein
   the spin-torque oscillator is configured to oscillate by the write current, and
   the current supply circuit supplies to the magnetic head the write current of which a current waveform on a positive polarity side and a current waveform on a negative polarity side are asymmetric.

2. The magnetic recording device according to claim 1, wherein the current supply circuit allows either one of an absolute value of a peak current on the positive polarity side and an absolute value of a peak current on the negative polarity side in the write current to be larger than the other so that the current waveform on the positive polarity side and the current waveform on the negative polarity side in the write current are asymmetric.

3. The magnetic recording device according to claim 2, wherein the current supply circuit supplies an overshoot current having an absolute value that is larger than that of the write current in a steady state to the magnetic head when a polarity of the write current is reversed and allows either one of an absolute value of a peak current on a positive polarity side and an absolute value of a peak current on a negative polarity side in the overshoot current to be larger than the other so that the current waveform on the positive polarity side and the current waveform on the negative polarity side in the write current are asymmetric.

4. The magnetic recording device according to claim 2, wherein the current supply circuit supplies an overshoot current having an absolute value that is larger than that of the write current in a steady state to the magnetic head when a polarity of the write current is reversed and maintains a peak current of the overshoot current for a predetermined time so that the current waveform on the positive polarity side and the current waveform on the negative polarity side in the write current are asymmetric.

5. A magnetic recording device according to claim 1, comprising:
   an error rate measurement unit that measures an error rate when information is written on the magnetic recording medium using the write current, wherein
   the current supply circuit executes test writing using the write current, acquires the error rate, and repeats the test writing while changing a waveform of the write current until the error rate satisfies a predetermined condition.

6. The magnetic recording device according to claim 1, wherein the current supply circuit allows either one of a current amplitude on the positive polarity side and a current amplitude on the negative polarity side in the write current to be larger than the other so that the current waveform on the positive polarity side and the current waveform on the negative polarity side in the write current are asymmetric.

7. The magnetic recording device according to claim 1, wherein the current supply circuit supplies a DC component to either one of the positive polarity side and the negative polarity side of the write current so that the current waveform on the positive polarity side and the current waveform on the negative polarity side in the write current are asymmetric.

* * * * *